United States Patent [19]

Wiedenmann et al.

[11] Patent Number: 5,404,840
[45] Date of Patent: Apr. 11, 1995

[54] COVERING DEVICE FOR AN AQUARIUM, TERRARIUM OR SIMILAR VIVARIUM

[75] Inventors: Walter Wiedenmann, Deizisau; Ulrich Herold, Oberboihingen; Gerhard Frank, Esslingen; Ferdinand Mayer, Schwäbisch Gmünd; Albert Baier, Deizisau; Michael Schmidt, Herrenberg; Jörg Plöger, Baltmannsweiler, all of Germany

[73] Assignee: Eheim GmbH & Co KG, Deizisau, Germany

[21] Appl. No.: 191,417

[22] Filed: Feb. 3, 1994

[30] Foreign Application Priority Data

Feb. 10, 1993 [DE] Germany .................. 43 03 866.2

[51] Int. Cl.$^6$ .................... A01K 63/00; A01K 63/06
[52] U.S. Cl. .................... 119/266; 119/269; 220/211
[58] Field of Search ............. 119/245, 265, 266, 246, 119/247, 269; 220/211

[56] References Cited

U.S. PATENT DOCUMENTS

| | | |
|---|---|---|
| 3,250,585 | 5/1966 | McQuarrie et al. . |
| 3,515,097 | 6/1970 | Sherman .................. 119/266 |
| 3,721,212 | 3/1973 | Groth .................... 119/266 |
| 3,805,740 | 4/1974 | Hall ...................... 119/266 |
| 3,834,351 | 9/1974 | Schmidt .................. 119/266 |
| 3,857,366 | 12/1974 | Willinger . |
| 3,913,526 | 10/1975 | Hall ...................... 119/266 |
| 4,342,401 | 8/1982 | Panthofer ................ 220/301 |
| 5,065,884 | 11/1991 | Naritomi et al. . |
| 5,328,049 | 7/1994 | Ritzow ................... 220/345 |

FOREIGN PATENT DOCUMENTS

| | | | |
|---|---|---|---|
| 2731363 | 1/1979 | Austria ............... | 119/266 |
| 1214039 | 3/1986 | Austria ............... | 119/266 |
| 1151593 | 1/1958 | France . | |
| 2553645 | 4/1985 | France . | |
| 7925998 | 1/1980 | Germany . | |
| 1529801 | 10/1978 | United Kingdom . | |
| 2192654 | 1/1988 | United Kingdom . | |
| 2226940 | 7/1990 | United Kingdom ...... | 119/266 |
| 9115647 | 10/1991 | WIPO . | |

Primary Examiner—Paul J. Hirsch
Attorney, Agent, or Firm—Michael J. Striker

[57] ABSTRACT

The covering device for an aquarium, terrarium or like vivarium for living things includes an approximately rectangular frame (13); an upwardly openable cover member (15) pivotally mounted on the frame; a lighting device (17) mounted on the bottom side (16) of the cover member (15); a device for locking and releasing the cover member (15) when it is in a closed position on the frame (13) and a drive mechanism (18) for pivoting the cover member (15) upward automatically automatically to open it when the cover member (15) is released by the locking and releasing device, at least over a predetermined initial pivot angle range. A brake device for braking the action of the drive mechanism can also be provided.

75 Claims, 7 Drawing Sheets

COVERING DEVICE FOR AN AQUARIUM, TERRARIUM OR SIMILAR VIVARIUM

BACKGROUND OF THE INVENTION

The present invention relates to a covering device for an aquarium, terrarium or the like vivarium for living things.

A covering device is known including a rectangular frame, a pivotable, openable cover member and a lighting device mounted on the bottom side of the openable cover member.

A covering device for an aquarium of the above-described type is described in German Patent DE-GM 79 25 998. The frame of this covering device extends in an uninterrupted manner around the entire periphery of the aquarium and comprises a plurality of sections, which are placed on the top of the aquarium. The opening bounded by the frame is closable by a front cover member, which is pivotable about a horizontal pivot axis extending in the vicinity of its rear end on pivot elements on transverse frame members. A lighting device is mounted on the bottom side of the front cover member, which is closed to the aquarium by a light housing, which is attached tightly to the bottom side of the cover member. This cover member extends over about three fourths of the cross-section of the frame. The remaining opening of the frame, at the rear side of the rear edge of the front cover member, is closed by a rear cover member, which extends like the front cover member over the enter longitudinal extent of the frame and which is pivotable in an opposite direction to the front cover member about a horizontal pivot axis and thus is openable forwardly. This pivot axis can be coincident with the pivot axis for the front cover member. The approximately rectangular frame is divided by a longitudinal cross member in the vicinity of both pivot axes of both front and rear cover members. The lighting device is received in the upwardly openable front cover member mounted so as to be pivotable to the front frame member. An approximately horizontal separating wall is mounted on a rear frame portion and spaced under the rear cover member, which can hold sockets, electric regulators, thermometers or other auxiliary devices, e.g. also filters or pumps.

The front cover member carrying the lighting device, is already comparatively heavy, because of the comparatively heavy lighting device. The folding up of the front cover member is thus somewhat troublesome, since it requires a considerable upward force. Furthermore front cover member must be held in an opened position according to the opening angle to avoid automatic closing and the damages that result from that.

SUMMARY OF THE INVENTION

It is an object of the present invention to provide a covering device for an aquarium, a terrarium or the like vivarium, having a front cover member which can be opened comparatively simply and easily despite the presence of a comparatively heavy lighting device attached to the front cover member.

According to the invention, covering device for an aquarium, terrarium or like vivarium for living things includes an approximately rectangular frame; an upwardly openable cover member mounted on the frame, having a bottom side and pivotable about a pivot axis; a lighting device mounted on the bottom side of the cover member; and drive means for pivoting the cover member upward automatically. The drive means is engaged with the cover member, is activated to open the cover member and, when activated, acts to pivot the cover member, at least over a predetermined initial pivot angle range.

Because of the drive means, when the cover member in the closed position is released, the cover member upwardly pivots and opens, at least over a predetermined initial pivot angle. After that the cover member can be further pivoted open into an extreme open position. The initial pivot angle range is advantageously selected to be large enough so that the user can easily and without great effort raise the cover member further during subsequent manual operation of the cover member and the drive means should place the cover member automatically in a suitable open position for doing that. The invention arise from the following basic consideration: the cover member supports a comparatively heavy lighting device and has a comparatively large lever arm so that a user can raise the cover member from the completely closed state in which the cover member is horizontal only with comparatively great effort in an entirely manual fashion. Thus the drive mechanism according to the invention is necessary to relieve at least a substantial portion of the considerable force required to raise the cover member from the closed position. Furthermore it is also possible within the scope of the invention to dimension and form the drive means so that the cover member is automatically pivotable open not only over the predetermined initial pivot angle but also to the extreme open position by the drive means so that the user is completely relieved of the necessity of exerting a force manually to open the cover member.

In a preferred embodiment of the invention means for releasing the cover member from the closed position are provided and the drive means has a drive energy storage means which stores the energy required for opening the cover member. The drive energy storage means is chargeable by closing the cover member and the drive means is activated by operating release means which releases the cover member from the closed position. The drive means can be a spring motor or the like spring drive, so that the drive energy storage means can be a spring element which is put under tension by the closing of the cover member and released to act when the cover member is released from the closed position. A leaf spring or coil spring such as are used in clock mechanisms can be used as the spring element. Spring elements can be provided at each end of the cover member acting on the cover member. Other drive energy storage devices can be used and include for example eccentric drive devices, driven plate devices and the like.

In a preferred embodiment of the invention the spring element of the drive means is at least one torsion spring. Torsion springs are particularly preferred because of their small spatial requirements and comparatively large pivoting torque and spring force.

It is particularly advantageous when the drive means has a drive energy storage means comprising a U-shaped component having a base portion consisting of a torsion rod pivotable in a longitudinal groove in the bottom side of the cover member and coaxial to the pivot axis of the cover member, two U-legs rigidly attached to the frame and an upwardly arched portion bearing on the cover member and connected to the torsion rod. This drive means is particular compact, simple and economical.

The frame advantageously includes two identical transverse side sections each having an inner side which face each other in the assembled frame. These transverse side sections can be extruded plastic parts and have an interiorly open and downwardly open box-like shape. They each have an interiorly projecting front supporting pin and rear supporting pin which support the cover member. The side section constructed in this manner is comparatively simple and economical. It can have an interior projecting crossmember, strap or the like, with which the side section sits on the upper edge of the wall of the aquarium or the like vivarium. When the side sections are plastic and formed in one-piece, only one tool is necessary for the assembly. The great rigidity can be obtained with a comparatively light weight by ribbing the side sections at suitable positions, which helps to reduce expenses in manufacture.

In a preferred embodiment the cover member has front legs and the release means includes locking elements for securing and releasing the cover member in and from the closed position. The locking elements can be mounted on a front end portion of respective ones of the side sections so that the locking elements engage on the front legs to hold the cover member in the closed position. The rear supporting pins extending from the side sections can engage in longitudinal grooves provided in pipe sections connected to the bottom side of the cover member so that the cover member is pivotable to and from the frame. The support pins can be hollow so that the torsion rod can pass through them to provide a compact structure for the covering device. The locking elements are advantageously provided at the front ends of the side section and are operable, e.g., by pressing them inward. Also the locking elements on both ends of the covering device are each a one-piece component and the left locking element is also usable on the right side so that costs are reduced. The cover member is thus lockable in the closed position with the locking elements engaged in both of its front ends. Thus it is guaranteed that the cover member always remains closed and does not automatically open for a variety of reasons or can not flutter or oscillate, e.g. because of vibrations. Since the drive means is charged when the cover member is in the closed position, a force acts on the closed cover member because of the torque acting on it in the opening direction and the cover member is pressed against the locking elements in the opening direction. In operation of the locking elements for release of the cover member the opening torque immediately acts to automatically raise the cover member. When the cover member is closed, the locking elements automatically engage the front legs and lock the closed cover member in place.

In a particularly advantageous form the locking elements each include a key which is pressed by the user and a protruding lock nose which engages under a strap on the front leg in which the locking element engages. The locking elements are mounted so that lock noses are withdrawn from the straps when the keys are pressed. This type of locking element is particularly simple and economical. Accordingly the locking nose need only be displaced a comparatively small distance to release the cover member. The strap on both sides of the cover member can be provided in an economical way by suitably shaping the legs to provide a shoulder.

When the vivarium is an aquarium, it is particularly advantageous to provide with underside of the cover member with interior drip legs from which condensing water can return to the aquarium so that it does not escape from the aquarium by condensing on the frame exterior.

A holding means for the lighting device is advantageously provided on the bottom side of the cover member and includes at least two angle sections spaced from each other transversely so as to be approximately parallel to the cover member front edge. These, e.g. two, angle sections can have lower end portions which are turned to face each other so that baffled housings for the lighting device can be held releasably by the holding means.

The cover member is advantageously made of extruded aluminum to reduce costs. Because of that the cover member can be cut to the size of the vivarium in a simple and cost effective manner.

In a particularly preferred embodiment braking means is provided for the drive means of the cover member which at least partially receives the weight of the cover member and holds the cover member open in the extreme open position. This brake device has the advantage that the cover member is held in each open position, advantageously continuously, and need not be held by the operator. The cover further can be released each time and remains automatically in the open position it has reached. Because of this, the operator now has a free hand with which he or she can reach through the opened frame to immediately perform a task in the vivarium. Advantageously then the lighting device on the bottom side of the cover member remains switched on and the operator's work can be satisfactorily illuminated.

Advantageously the braking means, which can be a friction brake device or a toothed brake device, is mounted on the cover member in the vicinity of the pivot axis. The braking means includes at least one brake arm pivotally mounted on one of the rear support pins adjacent, but spaced from, the side section from which the rear support pin extends. It is particularly advantageous when two brake devices are provided on each side of the cover member adjacent each side section. Each brake arm has a friction body rigidly attached to it so as to be pivotable about the cover pivot axis and the adjacent side section includes a braking or friction surface on which the friction body engages so that the friction body moves over the braking surface after opening of the cover member and pivoting the cover member over an initial opening angle range. When the friction body moves over the braking surface, it develops a frictional force on opening of the cover member to the extreme open position. Advantageously the friction body is an elastically deformable ring and can be a one-piece plastic part. The one brake arm can include a supporting sleeve coaxial to the cover pivot axis and the rear support pin of the adjacent side section engages in this supporting sleeve to provide a pivotal mounting of the brake arm on the rear support pin. The brake arm can also be provided with a support receptacle coaxial to the supporting sleeve, which is attached to an outer side of the brake arm facing the frame so as to be axially adjoining the supporting sleeve and the pipe section of the cover member engages in this support receptacle which projects with the friction body from the outer side of the brake arm in this preferred embodiment. This particular form of the braking means is simple to make and inexpensive. It can be mounted quickly and easily and can be readily replaced or exchanged. The friction body, in the form of an elastically deformable ring, moves over the braking. surface on further pivoting of the cover, resulting in its deformation, for example into an weakly oval shape. The restoring force which acts to restore the deformable ring to a circular shape presses it more strongly against the portion contacting on the braking surface and produces a frictional force. This braking device allows a continuous pivoting of the cover and automatic opening. A toothed brake device in contrast allows a reliable securing of the cover, because of the engagement of the teeth of two gears, and thus provides a stepwise pivoting of the cover.

In a particularly preferred embodiment the frame includes longitudinally extending front and rear profiled sections made from extruded aluminum. These profiled sections extend between both of the side sections and have ends overlapped by the side sections. Each of the profiled sections advantageously comprises upper and lower C-shaped sections connected one above the other centrally and a T-cross-sectioned piece connected to an inner side of the upper C-shaped section. Each of the profiled sections can have trough formed at its lower edge and each of the side sections has a protruding nose engagable in the trough of one of the profiled sections. Advantageously each of the profiled sections has a trough-like receptacle on its inner side spaced above its lower edge and each of the side sections has an attachment screw engaged in one of the trough-like receptacles. The profiled sections are identical so that only one type of profiled section need be manufactured. Since this type of profiled section is easily cut to different lengths, this type of profiled section can be used to assemble vivariums of a variety of lengths. Since it can be made of extruded aluminum it is comparatively inexpensive. A comparatively great strength is provided, limited by the above-described cross-sectional shape. This type of profiled section allows the mounting of different components and modules at different positions according to the needs of the user or manufacturer. Furthermore these profiled sections can be assembled with the side sections of the frame in a rapid, inexpensive, releasable, and yet strong, manner.

In another preferred embodiment the cover member extends approximately ¾ of a distance transversely across the frame to form a remaining rear region of the top of the covering device and the covering device also includes at least one individual module releasably supportable between a rear edge of the cover member and a rear longitudinal portion of the frame in this remaining rear region. Because of the use of the individual modules the user of the vivarium can cover the rear region as desired. These individual modules allow for later variation and changes in the covering device according to the invention.

They have the advantage that optional devices, which would otherwise hang freely, at least in the vicinity of the top portion of the cover member, are coverable by a suitably formed individual module, especially a cover module, so that the upper surface of the vivarium is completely covered by the covering device according to the invention. The individual modules further considerably simplify the necessary electrical connections and the running of electrical cables and further optional connections of hoses to pipe sections, e.g. pipe elbows. Suitable modules can be fixed in place neatly; also as the need requires a cover module can be provided to cutoff visibility. The individual modules can also be formed for passages of cables, hoses and the like through their rear end and to provide a cover over the rear region not covered by the cover member. This provides and neat, visually pleasing and protective solution to the problem of running cables, hoses and pipe sections into the vivarium.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

One embodiment of a covering device 10 is shown in the drawing, which is designed for an aquarium 11, for a terrarium or other vivarium for living things and is put on the upper open end or top of the aquarium. The aquarium 11 has there, e.g. a rectangular form. It is assembled from four walls 12, e.g. glass walls.

The covering device 10 has an approximately rectangular frame 13 and an upwardly openable cover member 15 pivotable about a pivot axis 14, on whose bottom side 16 a lighting device 17 is held.

Figures 11, 12, 13:
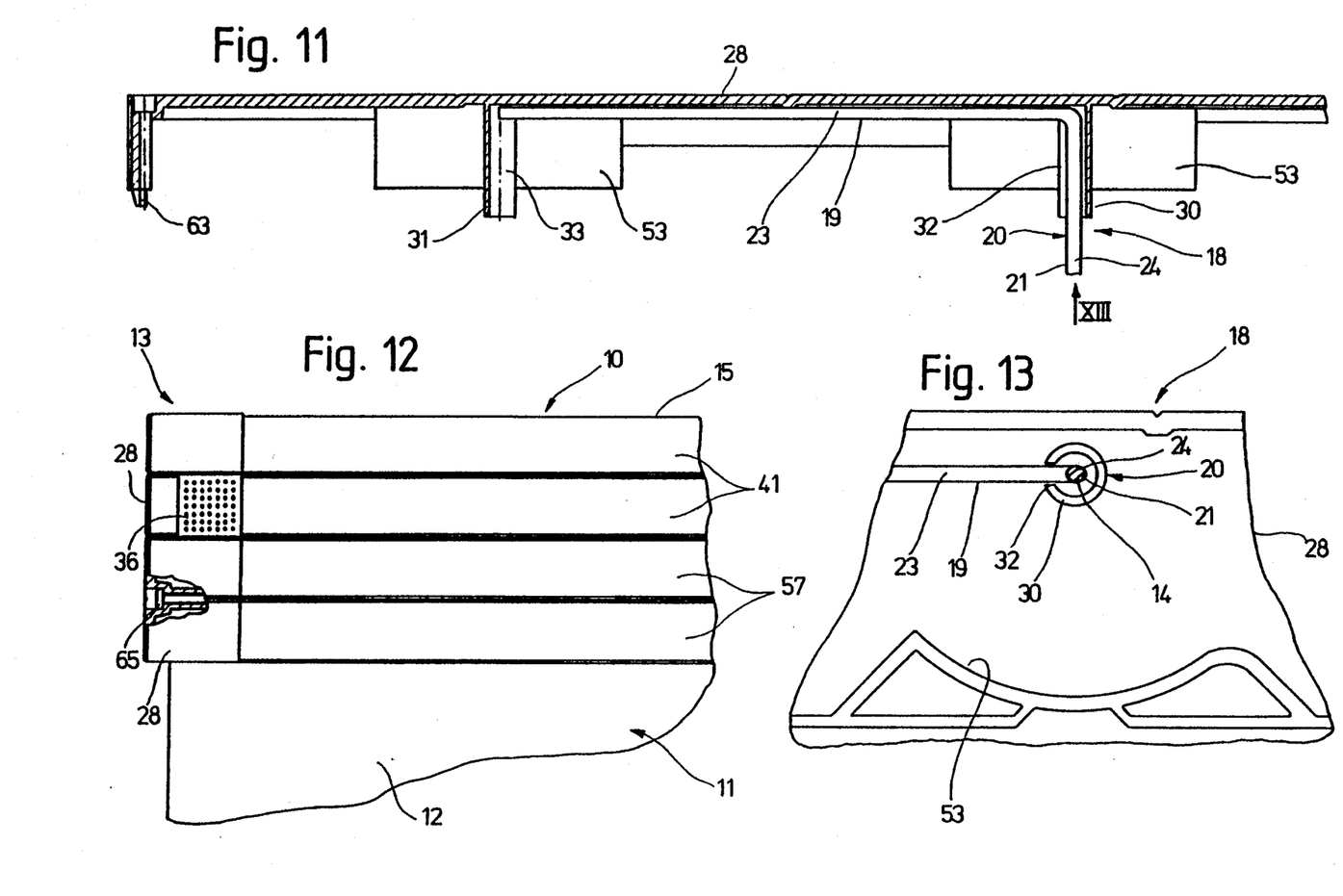
FIG. 11 is a schematic partially cross-sectional view of the left side portion of the frame from the covering device of FIG. 1.
FIG. 12 is a schematic partially front, partially cross-sectional view of a left corner portion of the covering device with closed cover member.
FIG. 13 is a simplified, partially side, partially cross-sectional view of the left side portion shown in FIG. 11 in the direction of the arrow XIII.

The covering device 10 has a drive mechanism 18 engaged with the cover member 15, which can be activated to open the cover member 15, by which the cover member 15 is automatically upwardly pivoted, at least over a predetermined initial opening angle range. The drive mechanism 18 has a drive energy storage means 19 which is charged by closing of the cover member 15 and which is activated to open the cover member 15 by pivoting the cover member 15, which drive energy storage means 19 can comprise an eccentric weight unit or a spring drive. The drive mechanism 18, particularly the drive energy storage means, has at least one spring means 20 engaged with the cover member 15, which is placed under increasing tension when the cover member 15 is closed and acts on the cover member 15 with its spring force to open the cover member 15 when the closed cover member is released by a release means. The spring means 20 is dimensioned so that it at least partially receives the weight of the cover member 15 with the lighting device 17 and holds it open at least substantially automatically in an extreme open position, which is shown, for example, in FIG. 4 and which, for example, adjoins the initial opening angle range shown in FIG. 1 after further pivoting of the cover member 15. The spring means 20 has at least one torsion spring element 21 which has at least one portion 23 fixed to the frame 13 and a portion 22 bearing and acting on the cover member 15, advantageously from the inside of it, which both are connected with each other by at least one torsion rod 24. Thus the spring means 20 forms an approximately U-shaped member. As seen in FIGS. 11 and 13 the portion 23 comprises one leg of a U-shaped member and on the opposite side a second U-leg is provided, both of which are attached to the frame 13. The base portion connecting both U-legs of the portion 23 has the portion 22 approximately in the longitudinal center, which is approximately loop-shaped and arched upwardly to bear on the inner bottom side 16 of the cover member 15. Torsion rods extend from both sides of this loop-shaped portion 22 until at the U-legs and form at least a part of the base portion. The approximately loop-shaped upwardly arched portion 22 in the tensionless state is oriented at an angle of 90° or greater, e.g. of 100°, in relation to the plane in which both U-legs of portion 23 and the torsion rods 24 extend from both sides of the loop-shaped upwardly arched portion 22.

Figure 4:
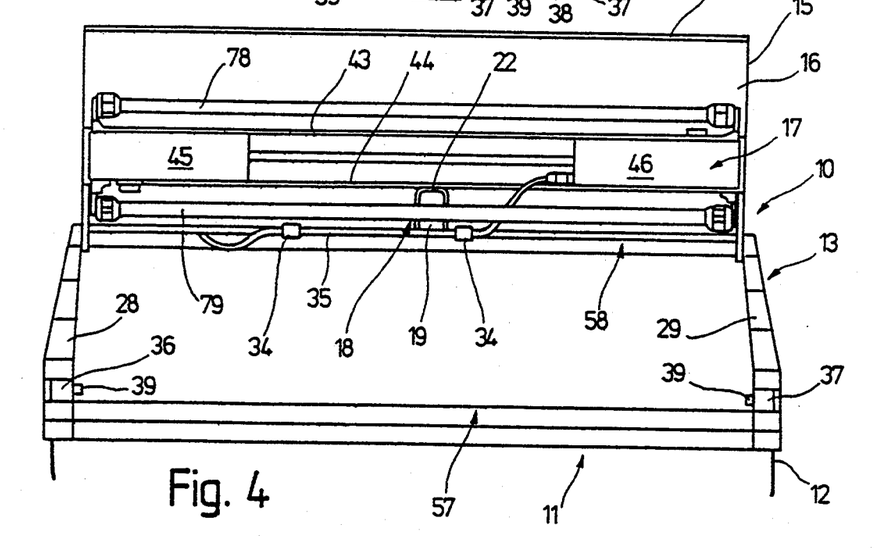
FIG. 4 is a schematic perspective view of the covering device of FIG. 1 with the cover member completely open.

When the cover member 15, as shown in FIG. 4, is entirely opened, the spring means 20 thus finds itself essentially in a tensionless state.

Figure 5:
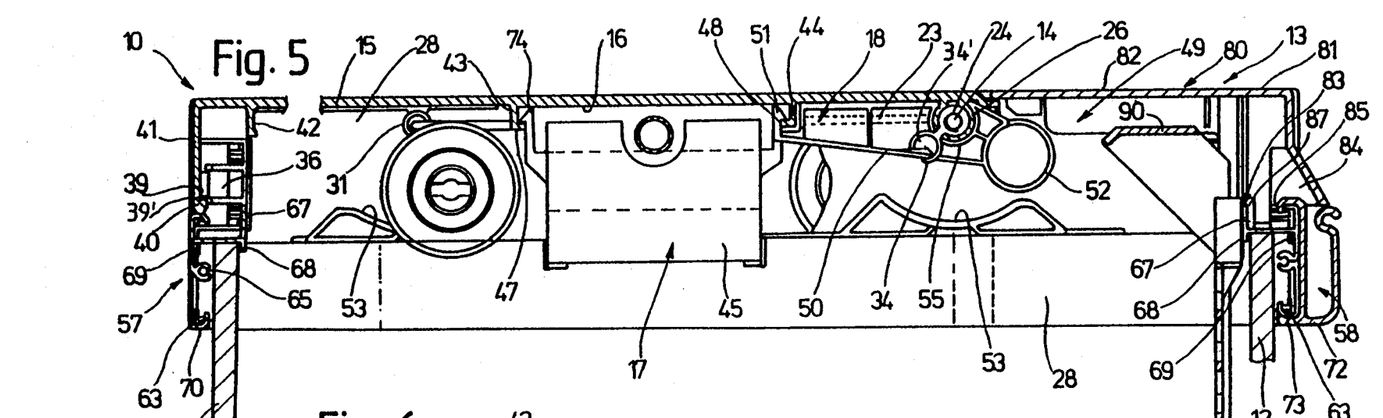
FIG. 5 is a schematic partially cutaway side cross-sectional view taken along the section line V—V of FIG. 1.

As seen in FIGS. 5, 11 and 13, the torsion rod 24 extends from both sides of the approximately loop-shaped portion 22 and is approximately coaxial to the pivot axis 14 of the cover member 15. The torsion rod 24 is inside an interior, advantageously molded, longitudinal groove 25 of the cover member 15. The longitudinal groove 25 is located in a pipe-like section 26 which has a cross-section which extends at least partially over a circular arc, which extends over the entire length of the cover member 15 and which has a throughgoing longitudinal slot 27 in it.

Both transverse side sections 28, 29 of the frame 13 are identical with each other and only reverse mounted, i.e. the right side section 29 is arranged with its inner side rotated about a vertical axis about 180° in relation to the left side section 28 so that the inner sides of the side sections 28 and 29 face each other. Details of the covering device 10 are thus for simplification shown with the aid only of the left side section 28. Both side sections 28,29 are injection molded plastic parts and advantageously are formed as box sections open downwardly and open inwardly. The left side section 28 has a rear support pin 30, which acts as a support for the cover member 15. Also a front support pin 31 is provided. Both support pins 30, 31 have the same spacing from their respective ends of the left side section 28. Thus in the other side section 29, the support pin 31 is used for support of the cover member 15. Each rear support pin 30 protrudes beyond the top side of the left side section 28 and engages at least with its protruding end in the coaxial longitudinal groove 25, preferably in the pipe-like section 26, in the cover member 15 for its pivotal support. Each support pin 30,31 is formed like a hollow pin, which has a longitudinal slot 32 and/or 33. The slots 32, 33 are provided in the support pins 30, 31 of each side section and face each other (FIG. 11). As seen in FIG. 11 and 13. Each torsion rod 24 with its transitional region, which joins the portion 23 (U-leg) continuously, is guided through the hollow support pin 30 in the vicinity of the pivot axis 14. The adjoining portion 23(U-leg) issues from the slot 32 of this support pin 30 and extends along this side portion 28 until at the support pin 31. The ends of the portion 23 engage in the slot 33 of this other support pin 31 and are held there fitting in that slot. As seen from FIG. 4 and 5, each torsion rod 24, which extends inside the longitudinal groove 25 of the cover member 15, simultaneously acts as a holding means, on which, for example, at least one holding clip 34, for example, a cable clip, e.g. holding a cable, is clamped. The holding clip 34 has gripping means, e.g. curved gripper elements 34', which fit in the longitudinal groove 25 and can engage there over the torsion rod 24. The side of the holding clip 34 directed toward the outside is formed identically with the other side engaged in the longitudinal groove 25. For example, a cable 35 of the lighting device 17 can be fixed between these curved outer gripper elements of the outer side.

The cover member 15 is locked by locking elements 36,37 engaging on both sides on the front longitudinal edge of the cover member 15 in its closed position (FIG. 5, FIG. 12). The locking elements 36,37 are held loosely secured in suitable receptacles in the front end regions of respective side sections 28, 29. Each locking element 36,37 has a key 38 and is spring-biased so that to automatically return to an initial position. The locking elements 36,27 are identical and only mounted in reverse position. Each key 38 has a protruding lock nose 39, which fits over a shoulder 40 in the cover member 15 to hold it in a closed position. When the key 38 is pressed this lock nose 39 is released from the shoulder 40.

Figures 1, 2, 3:
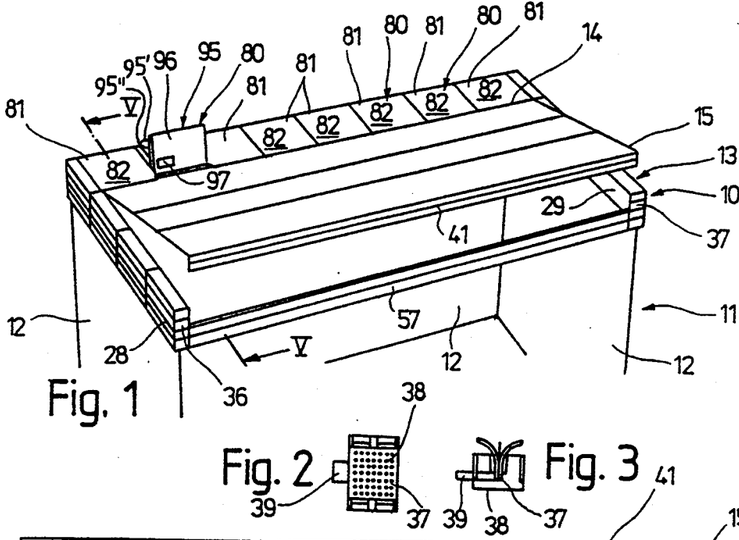
FIG. 1 is a schematic perspective view of a top side of an aquarium provided with a covering device according to the invention with a comparatively easy-to-open cover member.
FIG. 2 is a detailed side view of a locking element for the cover member.
FIG. 3 is a schematic top view of the locking element shown in FIG. 2.

The cover member 15 is formed as a substantially flat plate, which has front legs 41 protruding downward at approximately right angles to the front longitudinal edge, on which the respective lock noses 39 of the locking elements 36,37 engage. The front legs 41 each have on its lower end and at least in the vicinity of each end and the respective lock noses 39 the above-named horizontal shoulder 40, which protrudes from the front leg 41. The shoulder 40 is formed by a longitudinal protruding lip in the embodiment shown in the drawing. In the cover closed position these protruding lips on the left and right ends in FIGS. 1 and 4 are overlapped by the respective lock noses 39 of the locking elements 36 and/or 37 and of course by the bottom surfaces (39') of the lock noses 39. If the respective keys 38 are pressed, the lock noses 39 are moved further interiorly and thus release the shoulders 40 and thus the cover member 15.

The cover member 15 has interior, advantageously longitudinally extending, drip legs 42 (FIG. 5 and 6) projecting down from its bottom side 16 and spaced from the front legs 41. Two longitudinally extending angle sections 43,44 forming a longitudinally extending holding means or holder on the bottom side 16 of the cover member 15 are located approximately in the center portion of the cover member 15. Detachable parts, e.g. two adjacent baffled housings 45, 46 of the lighting device 17, are insertable into this holder and slidable in a longitudinal direction. The angle sections 43, 44 are spaced transversely from each other and each have lower end portions 47 and/or 48 facing each other, which are overlapped by the detachable parts held in the holding means, namely the baffled housings 45, 46. The cover member 15 is advantageously formed as a one-piece element and particularly as an extruded part, for example, made of aluminum. This part is therefore comparatively expensive and is in itself a rigid element.

Figures 6, 7, 8, 9, 10:
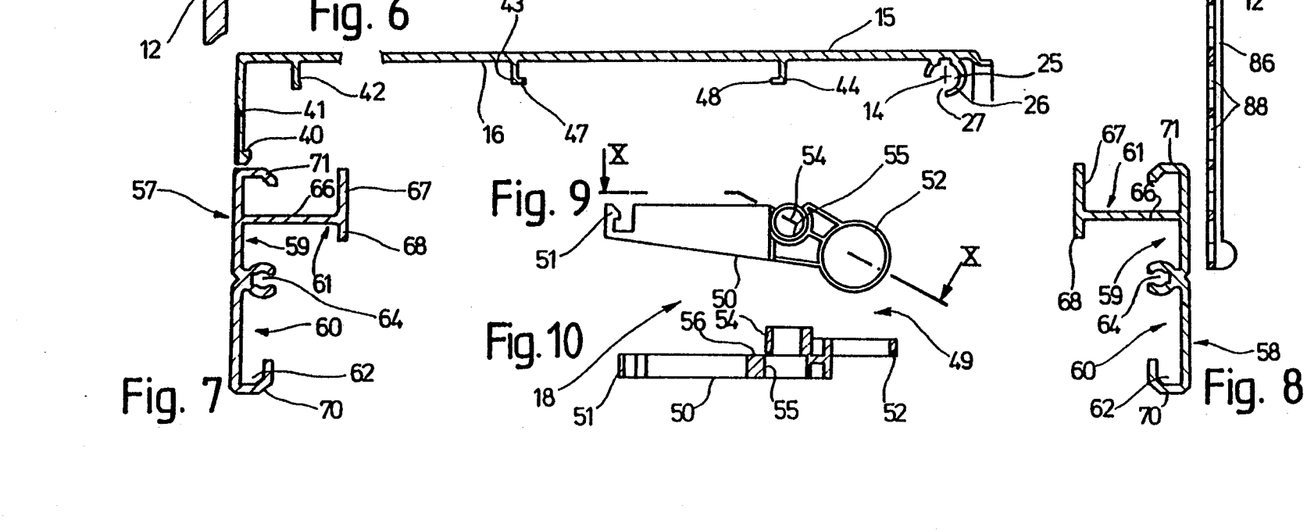
FIG. 6 is a schematic cross-sectional view only of the cover member.
FIGS. 7 and 8 are schematic cross-sectional views of front and/or rear profiled sections of the frame of the covering device.
FIG. 9 is a schematic side view of a component of a braking device for the covering device.
FIG. 10 is a partially schematic cross-sectional, partially top view taken along the section line X—X of the braking device of FIG. 9.

The drive mechanism 18 has a braking device 49, which in the embodiment shown in the drawing is arranged on each side of the cover member 15 in the vicinity of the pivot axis 14 between the latter and the respective side sections 28,29 and only the parts of the left braking device 49 are shown in FIGS. 5, 9 and 10. At least partly by means of the braking device 49 the cover member 15 is kept open at least substantially automatically in the extreme open position, e.g. as shown in FIG. 4. The braking device 49 can then receive the weight of the cover member 15 with all its parts. The braking device 49 cooperates with the drive mechanism 18 so that the cover member 15 together with all elements found on it is balanced in the extreme open position. The braking device 49 allows a continuous pivoting of the cover member 15 into the open position and/or the closed position and the cover member 15 is held automatically in the open position. Without that it is necessary for an operator to hold the cover open.

The braking device 49 is either—as not shown—formed as a toothed brake device with engaging teeth or as a friction brake. It has a lever-shaped brake arm 50 on each end of the cover member 50 in the vicinity of each of the side sections 28, 29, which is pivotally mounted on the rear support pins 30 of the side sections about the pivot axis 14 and engages in the cover member 15 with a hook 51 on one end spaced from the support pin 30. The hook 51 engages in the angle section 44 on the lower end portion 48. Because of that, the brake arm 50 is moved together with the cover member 15 when the cover member 15 is opened. On closing of the cover member 15 the bottom side 16 of the cover member 15 presses on the hook 51, whereby also the brake arm 50 is moved with it. The brake arm 50 has a friction body 52 pivotable concentrically about the pivot axis 14, which is made from a deformable elastic material, especially a ring, and can be deformed at least in the regions bordering on a device clamping it. Braking surface 53 is arranged on the side section 28 and extend along the pivot path of the friction body 52, on which the friction body 52 after opening of the cover member 15 engages and moves while pivoting about an initial opening angle region against a frictional force. The ring deforms on further opening of the cover member 15. FIG. 2 shows the closed position of the cover member 15, in which the friction body 52 is still out of engagement with the braking surface 53. When the cover member 15 is unlocked by pressing the locking elements 36, 37, the cover member 15 because of the drive mechanism 18, particularly the spring means 20, first automatically pivots about the pivot angle because of the spring forces, e.g. approximately so far as is shown in FIG. 1. After that the friction body 52 engages with the braking surface 53, and, of course, in such a way that the friction body 52 is elastically deformed approximately in an outer circular region and the restoring force opposing the deformation produces a pressing force, which presses the friction body 52 with its lower portion against the braking surface 53. The friction produced hereby on both sides of the cover member 15 suffices together with the released spring means 20, to further lift the cover member 15 and to hold it balanced in the open position. The cover member 15 can as needed by opened further by hand and released and thus is held automatically in the new extreme open position by the described means.

The brake arm 50 has a supporting sleeve 54 coaxial to the pivot axis 14, with which the braking arm 50 is pivotally mounted on the support pin 30. Further the brake arm 50 has a support receptacle 55 coaxial to the supporting sleeve 54, which is connected axially to the support receptacle 55 and in which the end portion of one of the pipe-like section 26 on the cover member 15 engages axially so that in this end portion a support of the cover member 15 on the projecting end of the rear support pin 30 can occur. As shown for example in FIG. 10, the friction body 52, especially the ring, and the support sleeve 54 on the brake arm 50 project from the outer side 56 of the arm facing the side section 28. The brake arm 50 is a single piece plastic part. The brake member, which is associated with the right side section shown in FIGS. 1 and 4, has a friction body 52 and support sleeve 54 protruding beyond its outer side 56.

Both longitudinally extending parts of the frame 13 are identical with each other and comprise a front profiled section 57 and a rear profiled section 58, for example, made of extruded aluminum extruded pieces. Both front and rear profiled sections 57,58 are placed between both side sections 28, 29 and engage over the ends of them. The side sections 28, 29 are approximately twice as high as the profiled sections 57,58 and protrude above the upper edge of the profiled sections 57,58 to a distance equal to about half their height.

The front legs 41 of the cover member 15 have a height which is approximately half the height of the side sections 28, 29, which is particularly seen in FIG. 12. With closed cover member 15 they contact with their lower edges on the upper side of the front profiled section 57, while the cover member 15 is received with both transversely running lateral edges approximately between both side sections 28, 29.

The profiled sections 57,58 each have, as seen in a transverse cross-section, two approximately C-sections 59,60 one above the other and connected in about the center of the profiled section. A T-cross-sectioned piece 61 is connected to the inner side of the upper C-section, as seen in transverse cross-section in FIG. 7. Each of the profiled section 57,58 has a trough 62 at its lower edge, in which a protruding nose 63 (FIG. 5) formed at a lower ends or edge of one of the side sections 28,29 engages and fits. In the space above the lower edge and the trough 62 each profiled section 57,58 has a trough-like receptacle 64 on its inside, in which an attachment screw 65 (FIG. 12) is held in the side section 28,29. Further each of the profiled sections 57,58 has a horizontally inwardly protruding angle member 66 and a vertical supporting member 67 connected to the angle member 66 acting as a supporting means and/or suspending means for suspendable and/or mountable and/or supportable structural elements, as is described in more detail hereinbelow. The vertical supporting member 67 extends vertically for a distance equal to about one quarter of the height of the profiled section. The angle member 66 has a downwardly directed portion 68, which extends from the vertical supporting members 67 and which engages inside the wall 12 of the aquarium terrarium or similar vivarium, on whose upper edge the covering device 10 with the frame 13 is placed. The front and rear wall 12 is thus received between this inner downwardly directed portion 68 and the remaining vertically oriented portion of the profiled sections 57,58, which contains the trough 62 and the receptacle 64 (FIG. 5). The frame 13 is thus placed with the horizontal angle member 66 on the upper smaller surface of the front and/or rear wall 12 of the aquarium 11. The space between the inner downwardly directed section portion 68 and the part of the profiled sections 57,58 engaging the wall 12 is dimensioned sufficiently large so that different wall thicknesses 12 can be positioned therebetween and also tolerance variations can be accommodated.

An inwardly projecting strap 69 is formed on both side section 28, 29 spaced above a nose 63, which engages in the end region on the back side of the profiled sections 57,58 and under the horizontal angle member 66 (FIG. 5).

Each of the profiled sections 57,58 has a lower and an upper inwardly directed member 70 and 71 at its lower edge and its upper edge respectively. The cross-sectional profile of the profiled sections 57,58 offers a large number of mounting possibilities for different parts. So that the retaining member 72, e.g. in the form of a cable holding clip, can be snapped from the outside onto the profiled section 58, it has an approximately C-shaped clip portion 73, which covers the upper and lower inwardly directed members 70 and 71 from the outside and engages on the profiled section 58 over its entire height. Furthermore at least the rear profiled section 58, which is formed by an upper member 71, with its top side forms a support surface for structural components contacting it, as is described in more detail hereinbelow.

Figure 14:
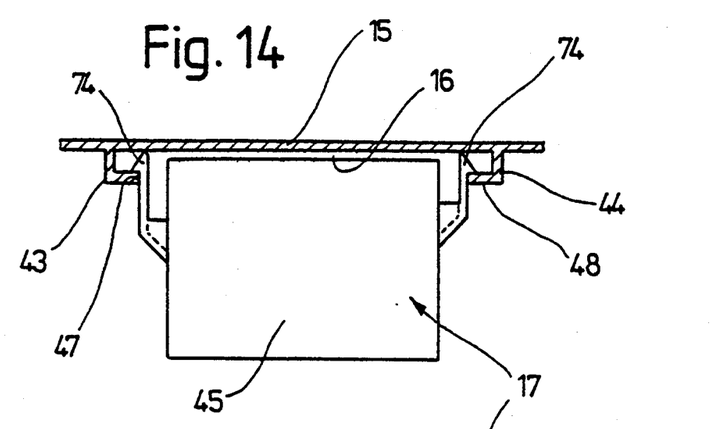
FIG. 14 is a schematic vertical cross-sectional view of a portion of the cover with the baffled housing of the lighting device attached to it.
Figure 15:
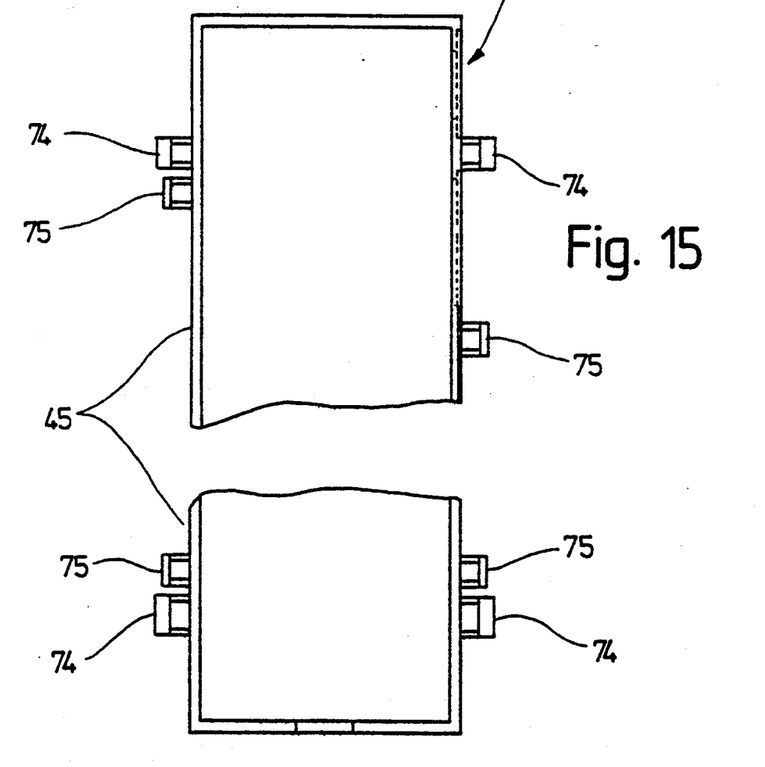
FIG. 15 is a schematic top plan view of the baffled housing of FIG. 14.

Both baffled housings 45,46 of the lighting device 17 are received releasably between both angle sections 43 and 44 on the bottom side of the cover member 15 and are held there. Each baffled housing 45,46 has, for example two, snap hooks 74 spaced from each other on each side of the baffled housing, which engage and fit on the lower end portions 47,48 of the angle sections 43 and/or 44 with their upper projecting hook portions. The snap hooks 74 are made of, e.g., plastic and are resilient at least to some extent, so that an easy mounting of the baffled housings 45,46 on the cover member 15 is possible but a reliable stationary mounting is guaranteed. As required however, the baffled housings 45,46 may also be loosely held between the angle sections. Moreover each baffled housing 45,46 has, e.g. two, guide straps 75 spaced from each other on each side of the baffled housing, which act as guides, spacing or adjusting elements or the like and can contact with their outer edges on the facing edges of the lower end portions 47, 48 of the respective angle sections 43, 44, so that each baffled housing 45,46 is held fixed between the lower end portions 47,48 as shown in FIG. 14. The holding of baffled housings 45,46 in the angle sections 43,44 however is such that the baffled housings 45,46 are slidable along the angle sections 43,44 and, because of that, allow different length lighting devices to be fit to the longitudinal dimension of the particular aquarium or like vivarium.

Figure 16:
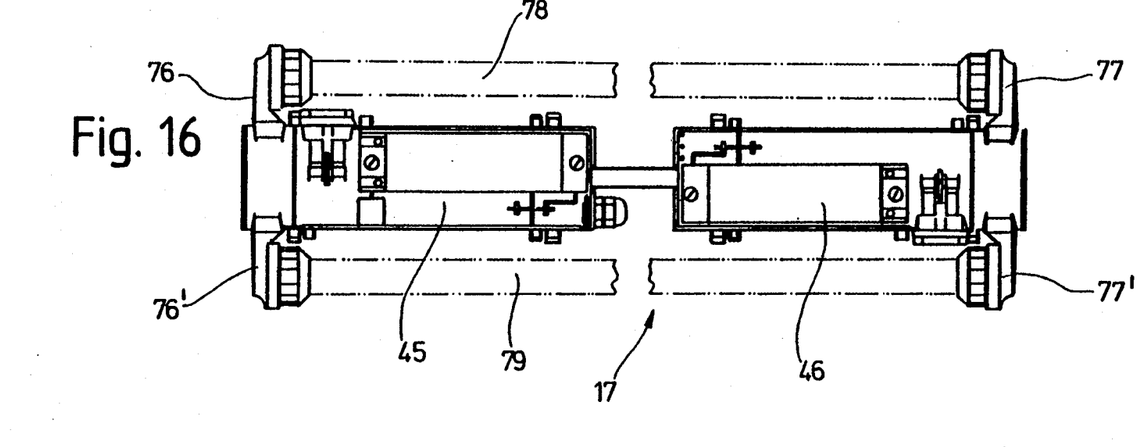
FIG. 16 is a cutaway schematic plan view of the lighting device.
Figure 17:
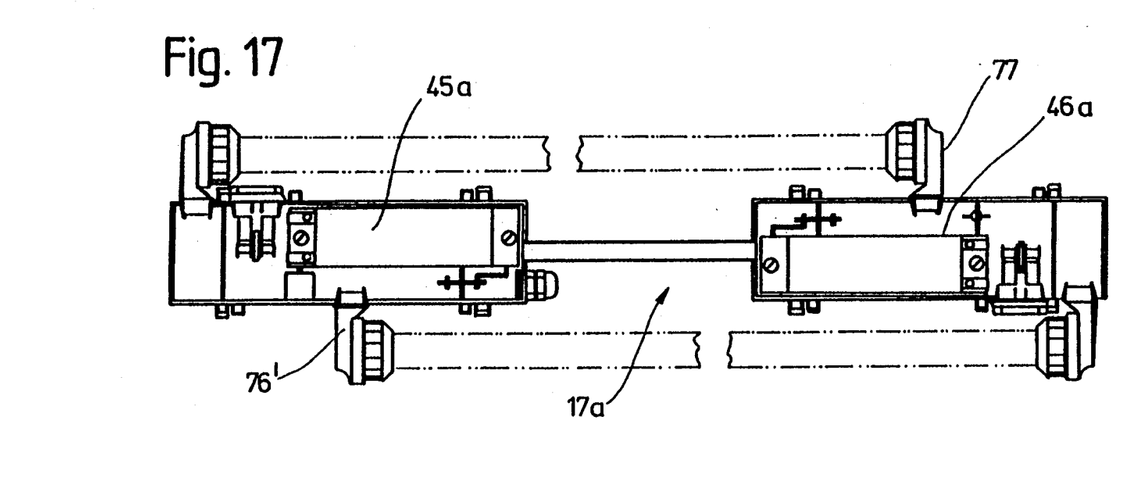
FIG. 17 is a cutaway schematic plan view of another embodiment of the lighting device.

Each baffled housing 45,46 has two attachment receptacles spaced from each other on each side of the housing for a socket 76,76' and/or 77,77'. A fluorescent strip lamp 78 and/or 79 is held between the sockets 76, 77 and/or 76',77' at each end of the lamp 78/and/or 79. The desired attachment receptacle for each socket 76,76' and/or 77,77' can be selected for the manufacture of the baffled housing and prepared in advance. In the baffled housing 45 shown in FIG. 16 both attachment receptacles are constructed during the manufacture of the baffled housings so that the sockets are outside of the baffled housings. In another embodiment shown in FIG. 17 the baffled housing 45a is constructed during its manufacture in contrast so that the attachment receptacle for the sockets 76',77' are at a different position on the baffled housing 45a,46a. This embodiment is preferred because by simple means a greater region, measured in the longitudinal direction of the covering device 10, is illuminated by the lighting device 17 and/or 17a. The attachment receptacles, which are not to be used on each baffled housing, are closed by means of sliding elements in tools in the manufacture of the baffled housing. Each baffled housing 45,46 and/or 45a, 46a is advantageously made from plastic.

The covering device 10 is formed so that the cover member 15 extends over a substantial portion, e.g. ¾, of the frame 13 in transverse direction across the device 10, and so that the remaining rear region of the cover member 15 is usable by individual, adjustably positionable modules 80, which extend up to the rear edge of the cover member 15 and are releasably securable to the rear longitudinal portion of the frame 13, especially to a rear profiled section 58 there. This kind of individual module 80 is shown in FIG. 1 and in FIG. 18 to 27.

The individual modules 80 can, e.g. be constructed as a cover module 81, as is predominantly the case for the modules shown in FIG. 1 on the rear region of the cover member 15. A cover module 81 is shown in FIG.

Figure 18:
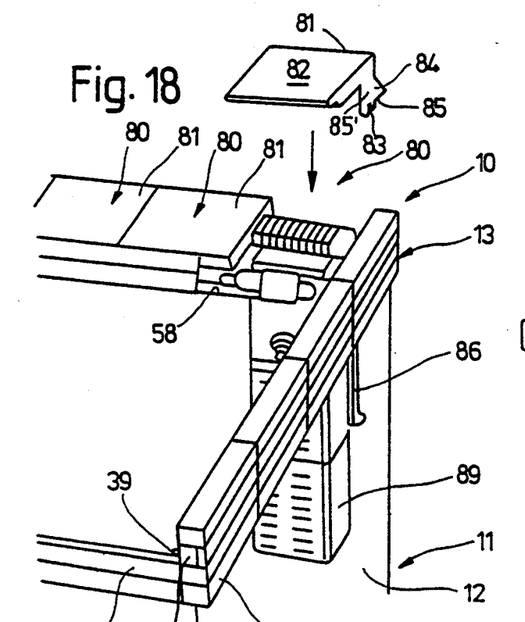
FIG. 18 is a schematic perspective view of the right portion of the covering device with an aquarium-interior filter suspended from it.
Figures 21, 22, 23:
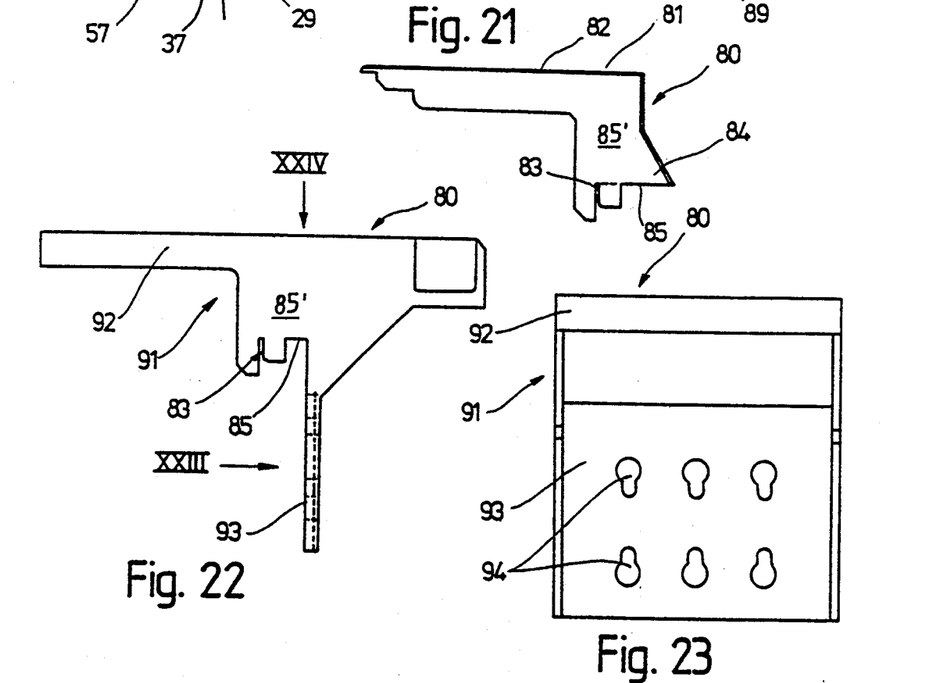
FIG. 21 is a schematic side view of a cover module.
FIG. 22 is a schematic side view of a box module.
FIGS. 23 and 24 are respective schematic plan views in the direction of the arrows XXIII and/or XXIV in FIG. 22.

18 and 21. The cover module 81 has an upper cover element 82, which extends to a rear edge of the cover member 15 from the rear side of the frame 13 and closes the rear region covered by the module 81. The individual module 80, e.g. the cover module 81, has, advantageously on both sides, a vertical side wall 85' provided with a vertical slot 83 open at its lower end and closed at its upper end. It is placable from above on the rear profiled section 58 so that the vertical supporting member 67 of the profiled strip 58 fits substantially exactly in the slot 83 and engages in it. The side wall portions on both sides of the slot 83 guarantee a support on the vertical supporting member 67. The individual module 80, especially the cover module 81, is thus vertically supportable on the vertical supporting member 67. Furthermore the individual module 80, e.g. the cover module 81, is also supportable on the upper inwardly directed member 71 of the profiled section 58, advantageously on both sides of the side wall, which adjoin the slot 83. The individual module 80 can thus be supported on the upper inwardly directed member 71. Instead of being supported on one or another supporting element of the profiled strip 58 or additionally each individual module is supportable also on the rear edge of the cover member 15. As is shown in FIG. 21 in the example of the individual module 80, especially the cover module 81, it has a downwardly open rear module portion 84 projecting rearwardly beyond the rear profiled strip 58, through which cables, hoses or the like can be guided from the outside. The rear module portion 84 can sit with the lower edge 85 of both of its sides walls on the upper side of the profiled strip 58, as shown in FIG. 5.

Since the feeding of cables, hoses or the like is not required through each cover module, the other cover modules which do not require that cables, hoses or the like be fed through them are not provided with the rear module portion 84.

Figure 19:
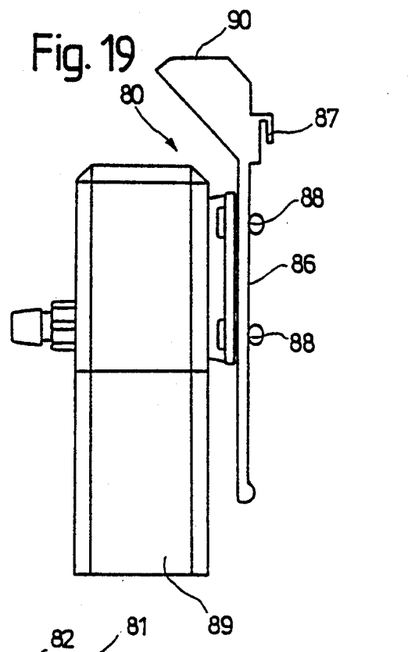
FIG. 19 is a schematic side view of a mounting plate with the interior filter attached to it.
Figure 20:
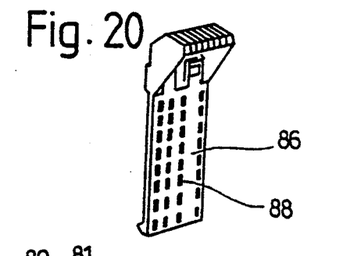
FIG. 20 is a perspective view of the mounting plate of the device shown in FIG. 19.

FIG. 18 to 20 further show that the individual module 80 can have a mounting plate 86 with upper suspension hooks 87, with which the mounting plate 86 is hung, advantageously inside the frame, on the vertical supporting member 67 of the rear profiled strip 58. In this way, as required, this type of individual module 80 can be quickly and simply suspended on the rear profiled strip 58, and in the same way easily taken from the covering device 10. The mounting plate 86 has holding elements 88, e.g. openings and holders, which can hold an auxiliary electrical device 89, e.g. an aquarium-interior filter. The mounting plate 86 has a top roof 90 on its upper end. The mounting plate 86 provided with the holding elements 88 is placed on the vertical supporting member 67 of the rear profiled strip 58 and hung there by its suspension hooks 87. The electrical cables of the electrical device 89 can be conducted under the top roof 90 and downward. A cover module 81, through whose rear module portion the electrical cable is guided, is placed on the aquarium in the vicinity of the mounting plate 86.

Figure 24:
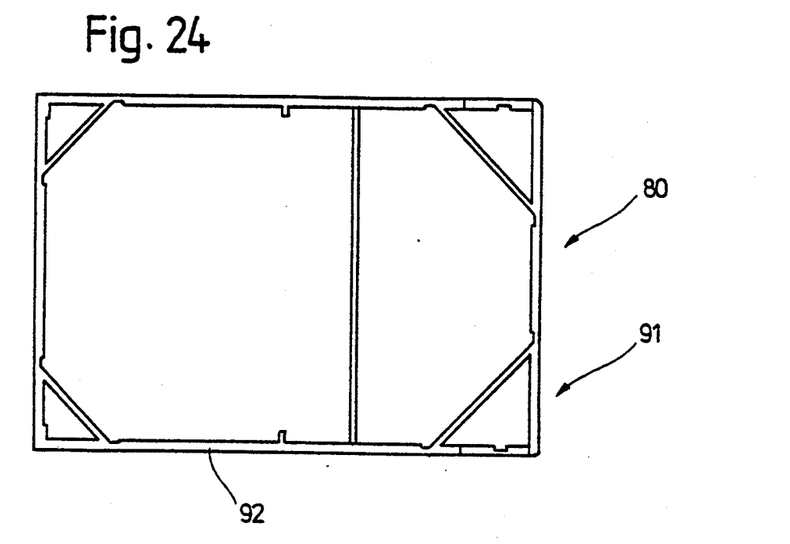

An individual module 80 is shown in FIG. 22 to 24, which acts as a supporting member for an unshown outer filter and is formed as a box module 91, which comprises an at least predominantly upwardly and downwardly open box 92 with vertical mounting plate 93 and holding elements 94, e.g. openings. The holding elements 94 act for receiving and attaching not shown additional pipe and/or tube portions, also for example for an approximately U-shaped tubing portion, which extends from the outside through the box 92 and from above downwardly into the aquarium 11. The connection of the unshown outer filter to these pipe and/or tube portions occurs in the usual way. The pipe and/or tube portions are thus conducted by the box module 91 from the outside into the interior of the aquarium. They are held fixed on the mounting plate 93 by the holding elements 94. The box module 91 has in the same way as the cover module 81 side wall portions provided with a slot 83 open downwardly, in which the vertical supporting member 67 of the rear profiled section 58 engages when the box module 91 is placed on the covering device 10. The box module 91 sits with its lower edges 85 on the upper side of the profiled section 58, as is clearly shown in connection with the cover module 81. The mounting plate 93 extends outside of the aquarium 11. The box module 91 is coverable on its top side by a plate or a cover module 81 so that then a smooth upper surface as shown in FIG. 1 is provided on the top side of the covering device 10.

Figure 25:
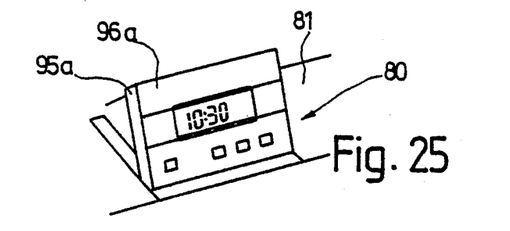
FIG. 25 is a perspective view of a module with a clock and timer.

In FIG. 1 the individual module 80 is formed as a technical module, which has a vertical, advantageously desk-like, inclined front wall 96. This technical module in FIG. 1 is a switch module 95, which contains an electrical switch 95" with cable with a plug and a socket connection in the switch housing 95', which is closed by the front wall 96. The switch knob 97 is mounted on the front wall 96 and is operable there. The switch 95" is an on-off switch, with which the lighting device 17 or especially an electrical device 89, e.g. in the form of the interior filter, is switched on and off. In FIG. 25 another embodiment of an technical module is shown as an alternative to the first embodiment shown in FIG. 1. This technical module is a clock module 95a with timer and display mounted on the front wall 96a. It is possible to equip the switch module 95 with these features by replacing the front wall 96 with the front wall 96a of the clock module 95a. It is only necessary to loosen the front wall 96 with the switch and electrical connection cable, whose plug is removed from the socket remaining in the housing of the technical module 95. This wall can then be replaced by the front wall 96a, in which the clock with the timer and display including the electrical cable are provided, whose plug is then plugged again into the socket in the switch housing and whose front wall 96a is then secured to the switch housing. Of course the covering device 10 could also be equipped with the clock module 95a initially in the same manner as it was with the switch module 95. Also the clock module 95a as illustrated can be mounted on the rear profiled section 58.

Figure 26:
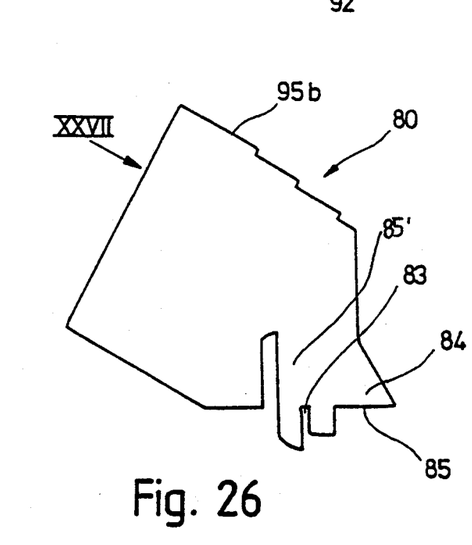
FIG. 26 is a schematic side view of an upper housing of a heating module.
Figure 27:
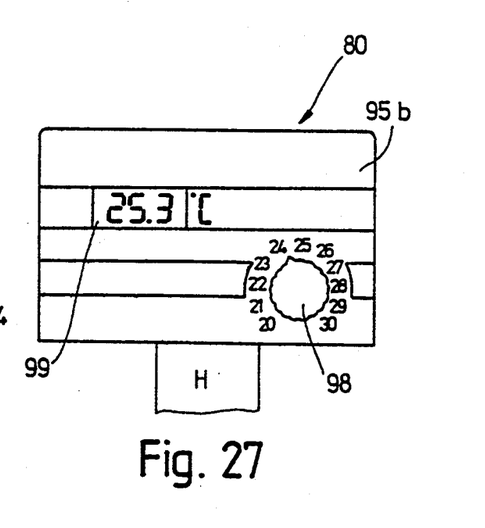
FIG. 27 is a plan view in the direction of the arrow XXVII in FIG. 27 of the heating module.

In FIG. 26 and 27 another technical module is shown which is a heating module 95b and has a heating element H, which extends from above into the aquarium 11. Further this heating module 95b has a temperature controller operable by hand and a thermometer device 99. Also this heating module 95b has a side wall on both sides each of which is provided with a downwardly open slot 83, which engages on the vertical supporting member 67 of the profiled section 58. Further here also in the same way as in the technical module 95 and 95a and in the cover module 91 according to FIG. 21 a rearwardly projecting and downwardly open box portion 84 is provided, through which the electrical cable can be guided. The side wall portions can sit with their lower edges 85 on the profiled strip 58.

A pH-value controlling module, a water level regulating module, a water conductivity value measuring module, a light intensity monitoring module for the lighting device 17 or a similar module can be used as other technical modules analogous to the above-described technical modules 95, 95a and 95b, by which other properties and parameters can be observed, controlled and/or regulated.

While the invention has been illustrated and described as embodied in a covering device for an aquarium, terrarium or similar vivarium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Covering device for a vivarium for living things comprising
   an approximately rectangular frame (13);
   an upwardly openable cover member (15) mounted on the frame (13), having a bottom side (16) and pivotable about a pivot axis (14);
   a lighting device (17) mounted on said bottom side (16) of said cover member (15); and
   drive means (18) for pivoting said cover member (15) upward automatically, wherein said drive means (18) is engaged with said cover member (15), is activated to open said cover member (15) and, when activated, acts to pivot said cover member (15) at least over a predetermined initial pivot angle range.

2. Covering device as defined in claim 1, further comprising means for releasing said cover member (15) to activate said drive means (18), and wherein said drive means (18) has drive energy storage means (19), said drive energy storage means (19) is chargeable by closing of said cover member (15) and said drive means (18) is activated by operating said means for releasing said cover member (15).

3. Covering device as defined in claim 1, wherein said drive means (18) includes spring means (20) engaging said cover member (15), said spring means (20) is placed under increased tension by closing of said cover member (15) and said cover member (15) is acted on by said spring means (20) when said cover member (15) is released by said means for releasing said cover member.

4. Covering device as defined in claim 3, wherein spring means (20) holds said cover member (15) open in an extreme open position at least substantially automatically and at least partially supports said cover member (15) in said extreme open position.

5. Covering device as defined in claim 4, wherein said spring means (20) includes at least one torsion spring element (21) comprising at least one portion (23) attached to said frame (13), at least one other portion (22) contacting and acting on said cover member (15) from an inside region and at least one torsion rod (24) connecting said at least one portion (23) attached to said frame (13) with said at least one other portion (22) acting on said cover member (15).

6. Covering device as defined in claim 4, wherein said spring means (20) comprises an approximately U-shaped component including two U-legs (23) attached to said frame (13), a base portion connecting both of said U-legs and including at least one torsion rod (24), a substantially loop-like upwardly arched portion (22) attached to said at least one torsion rod (24) and contacting said cover member (15), so that, when said spring means (20) is not under tension, said loop-like upwardly arched curved portion (22) is oriented at an angle of at least about 90° to a plane extending through both of said U-legs and said at least one torsion rod (24).

7. Covering device as defined in claim 6, wherein said at least one torsion rod (24) extends approximately co-axial to said pivot axis (14) of said cover member (15).

8. Covering device as defined in claim 7, wherein said cover member (15) is provided with an interior longitudinal groove (25) and said at least one torsion rod (24) is accommodated in said longitudinal groove (25).

9. Covering device as defined in claim 8, wherein said frame (13) include two identical transverse side sections (28,29) each having an inner side and said transverse side sections (28,29) are assembled in said frame so that said inner sides (28,29) face each other.

10. Covering device as defined in claim 9, wherein said transverse side sections (28,29) are extruded plastic parts and have an interiorly open and downwardly open box-like shape.

11. Covering device as defined in claim 10, wherein each of said transverse side sections (28,29) has two ends and an interiorly projecting front support pin (31) and an interiorly projecting rear support pin (30), and said front support pin (31) is spaced a distance from said end closest to said front support pin (31) equal to a distance from said rear support pin (30) to said other end; and at least said interiorly projecting rear support pins (30) support said cover member (15).

12. Covering device as defined in claim 11, wherein said rear support pins (31) engage in said longitudinal groove (25) provided on said cover member (15).

13. Covering device as defined in claim 12, wherein said longitudinal groove (25) of said cover member (15) is provided in a pipe section (26) connected with said cover member (15) and said pipe sections (26) is provided with a longitudinally extending slot (27).

14. Covering device as defined in claim 13, wherein each of said support pins (30,31) is a hollow pin provided with longitudinal slots (32,33) and said longitudinal slot (32) of said front support pin (30) faces said longitudinal slot (33) of said rear support pin (31) on each of said side sections (28,29).

15. Covering device as defined in claim 14, wherein said at least one torsion rod (24) connects continuously via a transition region with one of said U-legs (23), is guided through at least one of said rear support pins (30) in the vicinity of said pivot axis (14) and passes through said longitudinal slot (32) of said at least one rear support pins (30) so that said U-leg (23) connected thereto extends along said side section (28).

16. Covering device as defined in claim 15, wherein said U-leg (23) connected to said at least one torsion rod (24) engages in said front support pin (31) and is held therein.

17. Covering device as defined in claim 16, further comprising at least one holding clip (34) having curved gripper elements (34') and releasably engaging said at least one torsion rod (24) on a region thereof extending inside said longitudinal groove (25) of said cover member (15) with said curved gripper elements (34').

18. Covering device as defined in claim 17, wherein said cover member (15) has front legs (41), said release means includes locking elements (36,37) for securing and releasing said cover member (15), and said locking elements (36,37) are mounted in a front end portion of respective ones of said side sections (28,29) so that said locking elements (36,37) engage said front legs (41) to lock said cover member (15) into a closed position when said cover member (15) is moved into said closed position.

19. Covering device as defined in claim 18, wherein said locking elements (36,37) each have a key (38), a lock nose (39) overlapping a shoulder (40) of said cover member (15) when said cover member (15) is in said closed position and said locking elements (36,37) are spring-loaded so that, when said keys (38) are pressed, said lock noses (39) are withdrawn from said shoulders (40) to release said cover member (15), but automatically return to an initial position when released.

20. Covering device as defined in claim 19, wherein said cover member (15) comprises a substantially flat plate, and said front legs (41) are downwardly projecting from a front longitudinal edge of said flat plate and can engage said lock noses (39) of said lock elements (36,37).

21. Covering device as defined in claim 20, wherein each of said front legs is provided at a lower end thereof with a horizontal longitudinal protruding lip comprising said shoulder (40) in the vicinity of said lock noses (39) so that undersides (39') of said lock noses (39) can engage over said longitudinal protruding lip.

22. Covering device as defined in claim 21, wherein said cover member (15) is provided with interior longitudinally extending drip legs (42) on said bottom side (16) spaced from said front legs (41).

23. Covering device as defined in claim 22, further comprising holding means for said lighting device (17) attached to said bottom side (16) of said cover member (15), and wherein said lighting device (17) is mounted on said cover member (15) via baffled housings (45,46), said baffled housings (45,46) being held releasably by said holding means.

24. Covering device as defined in claim 23, wherein said holding means includes at least two angle sections (43,44) spaced transverse from each other on said cover member (15) and each provided with lower end portions (47,48) directed toward each other.

25. Covering device as defined in claim 1, wherein said cover member (15) comprises an extruded aluminum part.

26. Covering device as defined in claim 24, further comprising braking means (49) for said drive means (18), said braking means (49) at least partially supporting said cover means (15) and holding said cover means (15) open in said extreme open position.

27. Covering device as defined in claim 26, wherein said braking means (49) is mounted on said cover member (15) in the vicinity of said pivot axis (14) between said pivot axis (14) and said side sections (28,29).

28. Covering device as defined in claim 26, wherein said braking means (49) is a friction brake device or a toothed brake device with engaging gear teeth.

29. Covering device as defined in claim 27, wherein said braking means (49) comprises at least one brake arm (50) attached to a bottom side (16) of said cover member (15) and pivotally mounted on said rear support pin (30) of one of said side sections (28,29).

30. Covering device as defined in claim 29, wherein said at least one brake arm includes a friction body (52) pivotable concentrically about said pivot axis (14) and said braking means (50) includes a braking surface (53) of one of said side sections positioned for engagement with said friction body (52) when said friction body (52) is pivoted, so that said friction body (52) moves over said braking surface (53) after opening of said cover member (15) and pivoting said cover member (15) about an initial opening angle range and so as to provide a frictional force on opening of said cover member (15) to said extreme open position.

31. Covering device as defined in claim 30, wherein said friction body (52) is an elastically deformable ring.

32. Covering device as defined in claim 31, wherein said at least one brake arm (50) includes a supporting sleeve (54) coaxial to said pivot axis (14) and said rear support pin (30) engages in said supporting sleeve (54) to provide said pivotal mounting on said support pin (30).

33. Covering device as defined in claim 32, wherein said at least one brake arm (50) is provided with a support receptacle (55) coaxial to said supporting sleeve (54), said support receptacle (55) being attached to an outer side of said at least one brake arm (50) facing said frame (13) so as to be axially adjoining said supporting sleeve (54) and said pipe section (26) of said cover member (15) engages in said support receptacle (55).

34. Covering device as defined in claim 33, wherein said friction body (52) and said supporting sleeve (54) project from said outer side (56) of brake arm (50) facing said frame (13).

35. Covering device as defined in claim 34, wherein said at least one brake arm (50) is engagable in a form-locking manner with one of said angle sections (44) on said cover member (15).

36. Covering device as defined in claim 34, wherein said brake arm (50) has a hook (50) for engaging on said lower end portion (48) of one of said angle sections (44).

37. Covering device as defined in claim 36, wherein said brake arm (50) is a one-piece plastic part.

38. Covering device as defined in claim 9, wherein said frame (13) includes a longitudinally extending front profiled section (57) and a longitudinally extending rear profiled section (58), said profiled sections being made from extruded aluminum.

39. Covering device as defined in claim 38, wherein said profiled sections (57,58) extend between both of said side sections (28,29) and have ends overlapped by said side sections (28,29).

40. Covering device as defined in claim 39, wherein said side sections (28,29) are both approximately twice as high as said profiled sections (57,58) and protrude above said profiled sections (57,58) to a distance equal to about half a height of each of said side sections (28,29).

41. Covering device as defined in claim 40, wherein said cover member (15) is provided with side edges and front legs (41) having a bottom edge and said front legs (41) of said cover member (15) extend over about half of said height of said side sections (28,29) and, when said cover member (15) is closed, said bottom edge of said front legs (41) approximately bears on said front profiled section (57) and said side edges are received between said side sections (28,29).

42. Covering device as defined in claim 41, wherein each of said profiled sections (57,58) comprises upper and lower C-shaped sections (59,60) connected one above the other and a T-cross-sectioned piece connected to an inner side of said upper C-shaped section.

43. Covering device as defined in claim 42, wherein each of said profiled sections (57,58) have a lower edge and a trough (62) formed at said lower edge and each of said side sections (28,29) have a protruding nose (63) engagable in said trough of one of said profiled sections (57,58).

44. Covering device as defined in claim 43, wherein each of said profiled section (57,58) has a trough-like receptacle (64) on said inner side spaced above said lower edge and each of said side sections (28,29) has an attachment screw (65) engaged in one of said trough-like receptacles.

45. Covering device as defined in claim 44, wherein each of said profiled sections (57,58) has a horizontally inwardly extending protruding angle member (66) having a vertical supporting member (67) of a height equal to about one quarter of a total height of said profiled section, said vertical support member providing supporting means.

46. Covering device as defined in claim 45, wherein said angle member (66) has a downwardly directed portion (68) extending down from said vertical supporting member (67) and each of said profiled sections (57,58) has an upper and lower inwardly directed member (70,71) so that a wall (12) of said vivarium bears on said angle member (66) between said downwardly directed portion (68) and said lower inwardly directed member (70).

47. Covering device as defined in claim 46, wherein each of said side sections (28,29) has an interiorly projecting strap (69) above said protruding nose (63) and said interiorly projecting strap (69) engages under a horizontal portion of said angle member (66).

48. Covering device as defined in claim 47, wherein said upper inwardly directed member (70) and said lower inwardly directed member (71) are curved inwardly so said profiled sections (57,58) are substantially C-shaped and further comprising a retaining member (72) formed to engage said profiled sections (57,58) outside said frame (13), said retaining member being provided with a C-shaped clip portion (73).

49. Covering device as defined in claim 48, wherein said rear profiled section (58) is provided with a supporting surface for an individual module (80).

50. Covering device as defined in claim 23, wherein said baffled housings (45,46) of said lighting device (17) are held releasably between two angle sections (43,44) attached to a bottom side of said cover member (15), said angle sections (43,44) having lower end portions (47,48) facing each other.

51. Covering device as defined in claim 50, wherein each of said baffled housings (45,46) has at least one snap hook (74) on each housing side thereof and said snap hooks (74) have hook portions and engage over said lower end portions (47,48) of said angle sections (43,44) via said hook portions.

52. Covering device as defined in claim 51, wherein each of said baffled housings (45,46) has at least one guide strap (75) on each of said housing sides and said guide straps (75) bear on said lower end portions (47,48) of said angle sections (43,44).

53. Covering device as defined in claim 52, wherein each of said baffled housings (45,46) has two attachment receptacles for a socket (76,77) spaced from each other on each of said housing sides.

54. Covering device as defined in claim 53, wherein said baffled housings (45,46) are made of a plastic material.

55. Covering device as defined in claim 1, wherein said cover member (15) extends approximately ¾ of a distance from a front edge of said cover member (15) toward a rear longitudinal portion of said frame (13) to partially bound a remaining rear region, and further comprising at least one individual module (80) releasably supportable between a rear edge of said cover member (15) and said rear longitudinal portion of said frame (13) on said remaining rear region.

56. Covering device as defined in claim 55, wherein said at least one individual module (80) comprises a cover module (81) having an upper cover element (82).

57. Covering device as defined in claim 56, wherein said at least one individual module (80) is provided with a mounting plate (86) having upper suspension hooks (87) for hanging said at least one individual module (80) on a vertical supporting member (67) of a rear profiled section (58) of said frame (13) and said mounting plate (86) has holding elements (88) for an interior filter.

58. Covering device as defined in claim 57, wherein said mounting plate (86) has a top roof (90).

59. Covering device as defined in claim 57, wherein said mounting plate (86) is covered on a top side thereof by a cover module (81).

60. Covering device as defined in claim 55, wherein said at least one individual module (80) comprises a box module (91) having a vertical mounting plate (93) provided with openings for pipe and tube elements and holding elements (94) for mounting an outer filter.

61. Covering device as defined in claim 60, wherein said box module (91) is covered by a cover module (81).

62. Covering device as defined in claim 61, wherein said at least one individual module (80) is a technical module having an inclined front wall (96).

63. Covering device as defined in claim 62, wherein said technical module is a switch module (95) comprising a switch housing (95′) having said inclined front wall (96), an electrical switch (95″) held in said switch housing including an electrical cable with a plug and a socket connection in said switch housing and a switch knob (97) mounted on said front wall (96) and operable from outside of said switch housing.

64. Covering device as defined in claim 62, wherein said technical module is a clock module (95a) including a timer.

65. Covering device as defined in claim 63, wherein said front wall (96) is exchangeable with another front wall (96a) including a clock and timer.

66. Covering device as defined in claim 62, wherein said technical module is a heating module (95b) having a heating element (H) extending into said vivarium (11), a thermometer device (99) for indicating a temperature of said vivarium (11) and a temperature controller (98) connected to said thermometer device (99) and said heating element.

67. Covering device as defined in claim 62, wherein said technical module is a pH value controlling module.

68. Covering device as defined in claim 55, wherein said at least one individual module (80) includes vertical side walls (85′) having vertical slots (83) open downwardly and said at least one individual module (80) is engaged with a vertical supporting member (67) of said rear profiled section (58) of said frame (13) in said vertical slots (83).

69. Covering device as defined in claim 68, wherein said at least one individual module (80) is supportable on said vertical supporting member (67) of said rear profiled section (58) of said frame (13).

70. Covering device as defined in claim 68, wherein said at least one individual module (80) has a downwardly open rear module portion (84) having lower edges (85) and said at least one individual module (80) sits on said rear profiled section (58) with said lower edges (85) of said rear module portion (84).

71. Covering device as defined in claim 55, wherein said at least one individual module (80) is supportable on said rear edge of said cover member (15).

72. Covering device as defined in claim 55, wherein said at least one individual module (80) has a downwardly open rear module portion (84) projecting rearwardly beyond said rear profiled section (58) so that elements including cables and tubing can be guided into said vivarium (11) through said rear module portion (84).

73. Covering device as defined in claim 62, wherein said technical module is a water level controlling module.

74. Covering device as defined in claim 62, wherein said technical module is a water conductivity measuring module.

75. Covering device as defined in claim 62, wherein said technical module is a light intensity monitoring module.

* * * * *